Figure 1:
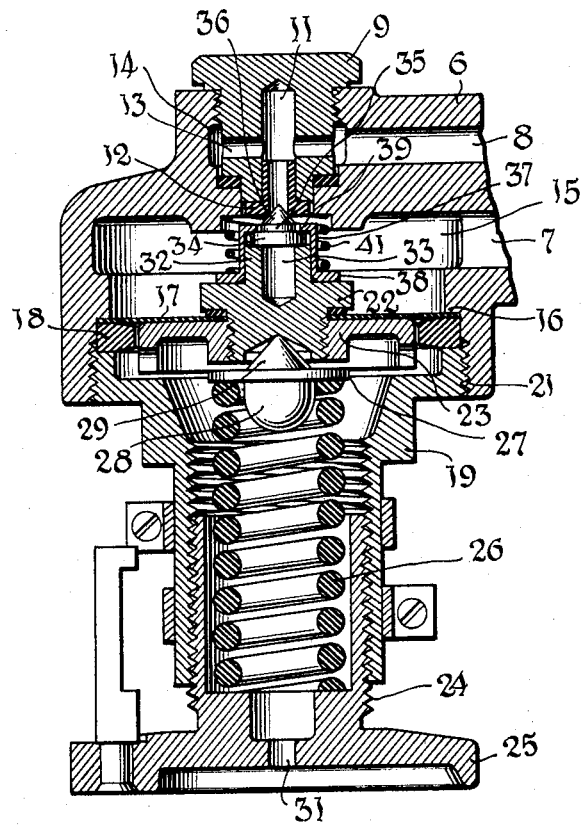

March 6, 1934.  C. A. CAMPBELL  1,949,559

VALVE

Filed March 11, 1931

Inventor
Charles A. Campbell
By
Dodge and Sons
Attorneys

Patented Mar. 6, 1934

1,949,559

UNITED STATES PATENT OFFICE 1,949,559

VALVE

Charles A. Campbell, Watertown, N. Y., assignor to The New York Air Brake Company, a corporation of New Jersey Application March 11, 1931, Serial No. 521,823

4 Claims. (Cl. 137—153)

This invention relates to valves, and particularly to diaphragm-actuated valves.

In many arts, notably the air brake art, extensive use is made of diaphragm-actuated valves, for example as a component of pump governors, feed valves, and the like. Inasmuch as it is impossible to insure perfect centering of the diaphragm and valve with reference to the valve seat, and inasmuch as irregular flexure of the diaphragm often destroys such centering, if it be attained, it has been almost the universal practice to make use of what is known as a pin valve.

Such a structure is illustrated at 33 in the patent to Clark, No. 499,450, June 13, 1893, and, briefly stated, it comprises a valve pin having a conical valve face at one end to coact with a sharp annular seat, and having at the other end a head which is held in thrust relation with the hub of the diaphragm by a coil spring. Sufficient clearance around the pin is afforded to insure that the pin will be self-centering.

While such valves have enjoyed extensive use and entirely meet the requirements of certain classes of service, they have a tendency in certain other and more severe classes of service to wear one side of the valve seat more than another, with the result that the seating action is ultimately impaired.

The present invention overcomes this defect, and provides a valve which is freely slidable transversely in all directions; which has the minimum resistance to its aligning motion; and which, after extensive test, has demonstrated superior operative characteristics, particularly as to maintained tightness.

For purposes of illustration the valve and the diaphragm upon which it is mounted will be described as embodied in a feed valve, but it is to be understood that this is merely illustrative and that the valve and diaphragm may be used in any relation in which diaphragm valves, for example those of the pin valve type, are now customarily used.

In the drawings:—

Figure 2:
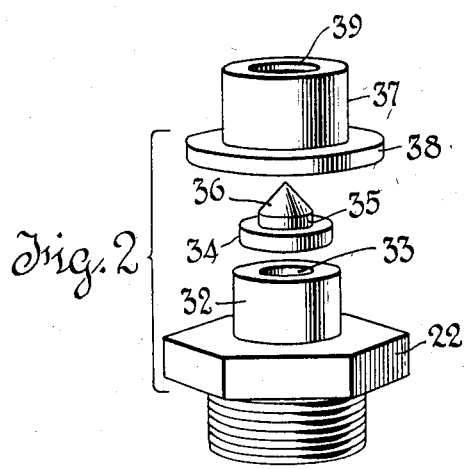

Fig. 1 is a vertical axial section through the diaphragm valve mechanism forming part of said invention; and Fig. 2 is a perspective view showing, on an enlarged scale, the mount for the valve, the valve itself, and the valve retaining sleeve, separated.

Referring first to Fig. 1, 6 represents a portion of the body of a feed valve. 7 is a passage leading from the brake pipe (it being assumed that the feed valve is to maintain brake pipe pressure) and 8 is the passage leading from the valve seat to the space above the regulating piston which controls the flow of main reservoir air to the brake pipe.

If further information as to the function of the parts just mentioned is desired, reference may be had to my prior patent No. 1,781,747, dated November 18, 1930.

Threaded into an opening in the top of the body 6 is a plug 9 which has an axial bore 11 into which is pressed the valve seat member 12. A plurality of transverse ports 13 communicate with the bore 11 and with the annular space 14 which in turn is in communication with the passage 8. The lower face of the valve seat 12 is presented in a circular chamber 15 with which the passage 7 directly communicates.

Seated upwardly against a shoulder 16 at the lower margin of the chamber 15 is a flexible diaphragm 17. This flexible diaphragm is clamped against the shoulder 16 by means of a filleted diaphragm-supporting ring 18. This ring is clamped to place by a combined spring box and nut 19 which is threaded at 21 into a circular opening formed in the lower face of the housing 6.

The diaphragm has a central aperture through which is inserted the threaded stem of a hub 22. This threaded stem receives a diaphragm bearer plate 23 which is threaded thereon and which moves freely in the central opening through the diaphragm-supporting ring 18.

Threaded into the lower end of the spring box 19 is an adjustable spring seat 24 which may be turned by a hand wheel 25 and which supports the lower end of a coil thrust spring 26. The upper end of the coil thrust spring bears against a flange 27 on the spring thrust member 28.

On the upper face of the spring thrust member 28 is a conical thrust member 29 which engages the apex of a more obtuse conical recess formed in the lower end of the hub 22. Downward motion of the diaphragm 17 is limited by collision of diaphragm plate 23 with a portion of the spring box 19, as will be apparent from an inspection of the drawing.

The interior of the spring box is vented to atmosphere through the port 31, so that the lower face of the diaphragm 17 is always subject to atmospheric pressure, which, together with the thrust of spring 26, resists the downward action of pressure in the chamber 15.

For the parts so far described, no novelty is herein claimed.

Referring now to Fig. 2, as well as Fig. 1, the hub 22 is formed at its center with an upward extending cylindrical boss 32 which preferably, but not necessarily, is counterbored at its center, as indicated at 33. The purpose of counterboring it is to reduce the area of contact with the laterally slidable valve about to be described, and to serve as a lubricating oil reservoir.

This valve comprises a disk-like base 34 of substantial diameter having a smaller cylindrical upward extension 35 upon the upper end of which is formed a conical valve surface 36. The diameter of the base materially exceeds the height measured from the lower surface to the circle of contact with the valve seat. The valve member is held in place on the upper end of the extension 32 by means of a retainer comprising a sleeve 37 having an outward extending flange 38 at its lower end and an inward extending flange 39 at its upper end. The opening within the flange 39 is larger than the diameter of the portion 35 of the valve, and the internal diameter of the sleeve 37 is larger than the external diameter of the disk 34.

Consequently, the valve member is free to shift laterally relatively to the hub 22. By making the hub 22 of brass and the valve member of highly polished non-corrosive alloy steel, very free action is secured.

The retainer made up of parts 37, 38 and 39 is intended to insure that the valve will be positively withdrawn from its seat. For this reason, the retainer should be fixed in position on the extension 32 in some manner. In the structure illustrated it is convenient to effect this result by means of a coil spring 41 which bears at its upper end against a portion of the body 6 and which bears at its lower end on the flange 38.

Where this arrangement cannot be used, the sleeve 37 may be staked to the extension 32, or may be fixed thereto in any other of the many ways which will readily suggest themselves to the skilled mechanic.

Where the spring 41 can be used, the strength of the spring must be sufficiently great to insure the unseating of the valve under all conditions. In any case, the flange 39 should closely overhang the disk 34, thus confining the valve without substantial lost motion to contact with the supporting face on the end of the extension 32. This, as is clearly shown in the drawing, is a plane surface normal to the line of movement of the valve in its motions toward and from the seat. The retainer is so formed that it may be forced to place and no further.

The advantages of the arrangement above described are that the valve has a large bearing surface and may, therefore, move freely; that it is not subject to any spring thrust which in the case of conventional pin valves often causes a lateral canting or binding; that because of its proportions it is free of canting tendency. The valve is guided for motion in a definite plane parallel with the normal plane of the diaphragm. The construction is simple, inexpensive to manufacture and easy to dismount and reassemble.

The diaphragm 17 with hub 22 and bearer plate 23, together with the valve elements 32 to 39, inclusive, may be substituted for conventional diaphragms with pin valves in a wide variety of mechanisms. No limitation to the feed valve or governor arts is implied. For example, diaphragm-actuated pin valves have been used extensively as terminal check valves in force feed lubricating systems, a service to which the present device is eminently suited.

What is claimed is:—

1. The combination of a valve seat; a flexible diaphragm; a hub carried by said diaphragm, and having a plane thrust surface parallel with said diaphragm and opposed to said seat; a valve member comprising a disk-like base slidable on said thrust surface and a conical valve coacting with said seat; a retainer for said valve comprising a sleeve encircling said hub and making a slip fit therewith, said sleeve having a portion which overhangs the marginal portion of said disk-like base; and a spring reacting between said valve seat and said retainer.

2. The combination of a valve seat; a flexible diaphragm; a hub carried by said diaphragm, and having a plane thrust surface parallel with said diaphragm and opposed to said seat; a valve member comprising a disk-like base slidable on said thrust surface and a conical valve coacting with said seat; a retainer for said valve comprising a sleeve encircling said hub and making a slip fit therewith, said sleeve having a portion which overhangs the marginal portion of said disk-like base; a spring reacting between said valve seat and said retainer; and means limiting the motion of said sleeve toward said diaphragm.

3. The combination of a valve seat; a flexible diaphragm; a circular hub projecting from the diaphragm toward said valve seat and having at its end a plane thrust surface parallel with said diaphragm and opposed to said seat; a valve member comprising a disk-like base slidable on said thrust surface and a conical valve coacting with said seat; a retainer for said valve comprising a sleeve slidably encircling said hub and having an inwardly extending flange which overhangs the marginal portion of said valve member, said sleeve seating on said hub to prevent clamping of said valve member by the sleeve; and a spring encircling a portion of said sleeve and reacting between said sleeve and said valve seat.

4. The combination of a valve seat; a member movable toward and from the same, and having a thrust surface normal to its direction of motion and presented toward the seat; a conical valve having a disk-like base slidable laterally on said thrust surface; a retainer in thrust relation with said movable member and having a portion overhanging the margin of said valve but out of clamping relation therewith; and a compression spring reacting between said retainer and a part associated with said seat.

CHARLES A. CAMPBELL.